(12) United States Patent
Wong (10) Patent No.: US 11,857,896 B2
(45) Date of Patent: Jan. 2, 2024

(54) FLUID FILTER FOR TREATING THE FLUID, A CONTAINER COMPRISING THE SAME AND AIR RELEASE DEVICE

(71) Applicant: KING'S FLAIR MARKETING LIMITED, Tortola (VG)

(72) Inventor: Siu Wah Wong, Tortola (VG)

(73) Assignee: KING'S FLAIR MARKETING LIMITED, Tortola (VG)

( * ) Notice: Subject to any disclaimer, the term of this patent is extended or adjusted under 35 U.S.C. 154(b) by 683 days.

(21) Appl. No.: 16/861,612

(22) Filed: Apr. 29, 2020

(65) Prior Publication Data

US 2020/0346138 A1 Nov. 5, 2020

Related U.S. Application Data

(60) Provisional application No. 62/840,799, filed on Apr. 30, 2019.

(51) Int. Cl.
*B01D 19/00* (2006.01)
*B01D 37/04* (2006.01)

(52) U.S. Cl.
CPC ....... *B01D 19/0063* (2013.01); *B01D 37/045* (2013.01)

(58) Field of Classification Search
CPC .......................... B01D 19/0063; B01D 37/045
See application file for complete search history.

(56) References Cited

U.S. PATENT DOCUMENTS

| | | | | |
|---|---|---|---|---|
| 3,814,245 A * | 6/1974 | Hirs | ................... | B01D 24/4631 210/279 |
| 6,322,705 B1 * | 11/2001 | Stornes | ................ | B01D 24/105 210/275 |
| 7,938,276 B2 * | 5/2011 | Goldman | ............... | B01D 29/27 210/502.1 |
| 2007/0187315 A1 * | 8/2007 | Vinogradova | .......... | C02F 1/003 210/85 |
| 2018/0099237 A1 * | 4/2018 | Silverwood | .......... | B01D 24/008 |

FOREIGN PATENT DOCUMENTS

WO   WO-2007010549 A1 *  1/2007  .............. C02F 1/283

* cited by examiner

*Primary Examiner* — Youngsul Jeong
(74) *Attorney, Agent, or Firm* — BROWDY AND NEIMARK, P.L.L.C.

(57) ABSTRACT

The present invention relates to a fluid filter for treating fluid, including a filter media for filtering the fluid, and a filter housing having a fluid impermeable plate to carry the filter media. The fluid outlets and the fluid outlets are arranged in a staggered manner in a height direction of the filter media, so that a flow path along which the fluid flows in the filter media is extended, preferably maximized, to provide an extended fluid residence time. The present invention also discloses a water container comprising the water filter and an air release device for discharge of air remaining in the water filter to an atmosphere.

22 Claims, 12 Drawing Sheets

FLUID FILTER FOR TREATING THE FLUID, A CONTAINER COMPRISING THE SAME AND AIR RELEASE DEVICE

FIELD OF THE INVENTION

The present invention relates to a fluid filter for treating the fluid, such as water. More particularly, the present invention relates to a water filter for removing impurities from the water, which has a compact configuration but presents an extended residence time for the fluid, and to a water container comprising such a water filter and an air release device for discharge of air remaining in the water filter to an atmosphere.

BACKGROUND OF THE INVENTION

Water is a basic necessity to sustain life. Accordingly, the need for clean and pure water will never be wane, especially when the public has increased awareness of the negative health effects associated with consuming water containing impurities. Consumers seeking better quality and taste have commercially driven a variety of filtration products providing health benefits, convenience and economy.

Traditionally, the filter designed for drinking water containers, such as pitchers or drinking bottles, is either in cylinder form or in disc form. For the filter in the cylinder form, the water throws vertically from the reservoir at the upper part of the water filter to pass through the filter and flows into the reservoir of the container. The filter in the cylinder form has a significant depth and therefore the longer residence time is required for the water to pass through the filter. During the filtration process, a part of the filter will submerge into the filtered water and develops a water pressure to slow down the flow rate. Also, the filter in the cylinder form occupies a significant part of the space of the container holding the filtered water.

For the filter in the disc form, the water will be entering the filter dish from one side of the filter and then leave out from the other side of the filter. During the filtration process, the filter will not be submerged into the filtered water, and hence a high flow rate can be maintained. However, the filter of disc form has a small filtration depth and would reduce the residence time of the water within filtering material, and therefore exhibit a poor filtration efficiency.

One of the popular filtration products has been the variety known as pour through filter pitchers. Typically, the traditional filter containing granular filtering material, such as activated carbon, occupies a relatively large volume in order to provide an increased filtration efficiency in the removal of contaminants and to provide an adequate filtering life before replacement is necessary. The relatively large volume of granular filtering material results in a typically bulky construction in the prior art pour-through filters. As a result, the size of the pitcher used with the filter has to be increased, and the usable volume of the pitcher has to be reduced; or a combination of larger reservoir and filter element has to be tolerated. In addition, granular filtering material cartridges are known to be subject to channeling in use, resulting in inadequate residence time and loss of filtering capability.

The drawbacks of traditional filters can be overcome by the invention herein disclosed, and greater utility and improved convenience can be achieved by the subject invention without diminishing the performance or economy.

SUMMARY OF THE INVENTION

The present invention has a principle object of providing a fluid filter of compact structure for removing impurities from a fluid, which achieves a high level of fluid treatment efficiently, fills rapidly to deliver clean and fresh tasting of water, and permits maximization of total volume of the container to be filled and utilized.

This and other objects are satisfied by the present invention, which provides a fluid filter for treating fluid in a fluid container, comprising a filter media for filtering the fluid, and a filter housing having a fluid impermeable plate to carry the filter media. The fluid filter comprises one or more fluid outlets formed through the fluid impermeable plate to allow the fluid to flow out of the filter, said one or more fluid outlets are arranged at a position deviated from one or more fluid inlets in a height direction of the filter media, through the fluid inlets the fluid enters into an interior of the filter media, so that a flow path along which the fluid flows in the filter media is extended, preferably maximized, to provide an extended fluid residence time.

In one preferred embodiment of the invention, the filter housing may be configured to comprise an open bottom, an upper rim, a top cover placed over the upper rim and having a plurality of fluid inlets formed therethrough, in addition to the fluid impermeable plate. The fluid impermeable plate may be disposed within the filter housing so as to define a gap between a side wall of the filter housing and the fluid impermeable plate, wherein the fluid flows into the plurality of fluid inlets and through the gap.

Preferably, the filter housing may further comprise a deflector plate provided between the top cover and the fluid impermeable plate and having a central aperture. In certain cases, the filter media may comprise a first filter material layer disposed between the top cover and the deflector plate, and a second filter material layer disposed between the deflector plate and the fluid impermeable plate. The fluid flowing from the fluid inlets of the top cover may be guided to flow into the first filter material layer and down through the central aperture of the deflector plate into a center of the second filter material layer, such that the fluid in the second filter material layer is deflected towards the side wall of the filter housing to reach the gap defined by the fluid impermeable plate and the side wall of the filter housing.

In certain cases, the first filter material layer may comprise nylon and/or a filterable non-woven fabric; and the second filter material layer comprises activated carbon, or ion exchange resin or a combination thereof.

A support member may laterally extend from the side wall of the filter housing to support the deflector plate. A plurality of spaced ribs may be provided to connect the support member and the fluid impermeable plate, thereby to define a plurality of windows between the deflector plate and the fluid impermeable plate, through the windows the fluid flows into the gap.

In one particularly preferred embodiment of the invention, the filter media may further comprise a third filter material layer disposed to close the open bottom of the filter housing, the liquid flowing through the gap is then guided to flow into the third filter material layer and out of the fluid filter. Advantageously, the third filter material may be configured as a laminate comprising a supporting layer, a prefilter layer, a nanofiber-coated layer, and a nanofiber layer seen in a direction of fluid flow direction. For example, the supporting layer may comprise polyethylene terephthalate (PET) having a basic weight in the range of about 10 to 80 gsm, preferably about 40 gsm; the prefilter layer may comprise an absorbent fabric having a basic weight in the range of about 10 to 150 gsm, for example about 40 to 80 gsm, preferably 65 gsm; the nanofiber layer may comprise a plurality of polymer-based nanofibers having a diameter in the range of 10 to 900 nanometer; and the nanofiber-coated layer may comprise PET coated with a plurality of polymer-based nanofibers having a basic weight in the range of about 5 to 70 gsm, preferably about 30 gsm. Advantageously, the laminate may further comprise a protective layer as an outermost layer, and the protective layer comprises PET having a basic weight in the range of about 5 to 70 gsm, preferably about 30 gsm.

In another embodiment of the invention, one or more fluid inlets may be arranged adjacent to a periphery of the filter media, and a single one fluid outlet may be centered in the fluid impermeable plate to create a tortuous flow path for the fluid. In a yet embodiment of the invention, a single one fluid inlet may be centered on the filter media, and the fluid outlets may be arranged adjacent to a periphery of the fluid impermeable plate to create a tortuous flow path for the fluid.

In another embodiment of the invention, the filter media may comprise one or more layers of filter materials of same type or different types. Preferably, the filter media may be configured to have a multi-layered structure comprising a first filter material layer, a second filter material layer and a third filter material layer in a direction of fluid flow. The first filter material layer may comprise nylon or filterable non-woven fabric, the second filter material layer may comprise activated carbon, or ion exchange resin or a combination thereof, and the third filter material layer may comprise a nanofiber. The non-woven fabric may be preferably in the form of a multi-layer structure comprising polyacrylonitrile (PAN) and/or polyethylene naphthalate (PEN).

Because of the tortuous design to extend the flow path for the fluid, the fluid filter may be advantageously configured in a disc form, depending on the size and application of the water container. A ratio of the width to the depth of the filter may be in the range of 1:1, 2:1, 3:1, 4:1, 5:1, 6:1, 8:1, 10:1, 12:1, 15:1, 18:1, 20:1, 25:1 to 30:1.

A yet aspect of the invention provides an air release device intended for use in a fluid filter for discharge of air remaining in an interior of the fluid filter to an atmosphere, which is incorporated into a filter housing of the fluid filter at a position adjacent to an upper rim of the filter housing. For example, the air release device may be attached into the filter housing, for instance to a side wall of the filter housing at a position adjacent to an upper rim of the filter housing.

The air release device in one embodiment of the invention defines an inner cavity through which the interior of the fluid filter communicates with the atmosphere in fluidic manner. The air release device comprises a floating ball that is located in the inner cavity and capable of floating on the fluid. The floating ball may be caused to ascend until at least a part of the floating ball blocks the fluid communication between the interior of the fluid filter and the atmosphere when fluid level in the inner cavity rises; and the floating ball may descend and resume the fluid communication between the interior of the fluid filter and the atmosphere when the fluid level falls In a specific embodiment of the invention, the air release device further comprises:
  a fixing portion attached to the filter housing,
  at least one air inlet through which the air remaining in the interior of the fluid filter flows into the inner cavity,
  one or more apertures or channels formed at a lower part of the inner cavity to allow for inflow of the fluid from the fluid filter,
  an air outlet positioned at an upper part of the inner cavity, and
  a passageway in communication with the air outlet and leading to the atmosphere,
  wherein the floating ball ascends until at least a part of the floating ball blocks the air outlet when the fluid level in the inner cavity rises; and the floating ball descends and moves away from the air outlet when the fluid level falls.

In a particularly advantageous embodiment of the invention, the air release device comprises a fixing portion attached to the filter housing. The air release device defines an inner cavity fixed to the fixing portion, and further comprises:
  at least one air inlet through which the air remaining in the fluid filter flows into the inner cavity,
  one or more apertures or channels formed at a lower part of the inner cavity to allow for inflow of the fluid from the fluid filter,
  an air outlet positioned at an upper part of the inner cavity,
  a passageway in communication with the air outlet and leading to ambient environment, and
  a floating ball that is located in the inner cavity and capable of floating on the fluid, wherein the floating ball is caused to ascend until at least a part of the floating ball blocks the air outlet when fluid level in the inner cavity rises; and the floating ball descends and moves away from the air outlet when the fluid level falls.

Preferably, the air release device may comprise a sealing member arranged between the fixing portion and the filter housing to create a sealing effect for the passageway.

Another aspect of the invention is to provide a water container having a water purifying device, wherein the water purifying device comprises a fluid filter of the invention. The filter housing of the fluid filter may be provided with an upper rim adapted to engage with an open-top rim of the container. One particular example of the water container is water filter pitchers, for example pour through pitchers, including a reservoir for storing filtered water, and the fluid filter of the invention configured as a pitcher top removably engageable with an open-top rim of the reservoir.

DETAILED DESCRIPTION OF THE INVENTION

While this invention is illustrated and described in preferred embodiments, the fluid filters and the containers of the present invention may be produced in many different configurations, sizes, forms and materials.

Referring now to the drawings, FIGS. 1 to 4 illustrate a water filter constructed consistent with a first preferred embodiment of the present invention. The water filter 100 is in a compact disc shape and comprises a housing 110 having open top and open bottom, an upper rim 111 adjacent to the open top, a top cover 112 removably placed over the upper rim 111, a handle 113 extending upwardly from the top cover 112 and useful to grasp the top cover 112. The top cover 112 is formed with a plurality of apertures which serve as water inlets 114 of the water filter 100 to allow for flow of the water into the housing 110. The water inlets 114 are distributed over the whole top cover 112, which may increase the flow rate of the water into the filter 100.

The housing 110 houses a deflector plate 120 snugly carried on a support member 121 that laterally and circumferentially extends from a side wall of the housing 110, and a water impermeable plate 130 disposed in a vertical direction relative to the deflector plate 120 in spaced-apart fashion. In this embodiment, the deflector plate 120 is detachably carried on the support member 121, and this detachable structure provides the ease of cleaning the filter 100 and replace the filter media. As clearly shown in FIG. 4, the deflector plate 120 has a central aperture 122 to allow for flow of the water therethrough. The deflector plate 120 is preferably made of water impermeable material, such as water impermeable resin, to prevent the water from flowing downwardly through other regions of the deflector plate 120 than the central aperture 122. The water impermeable plate 130 has a diameter smaller than an inner diameter of the housing, so that a circular gap 131 is defined therebetween.

Figure 2:
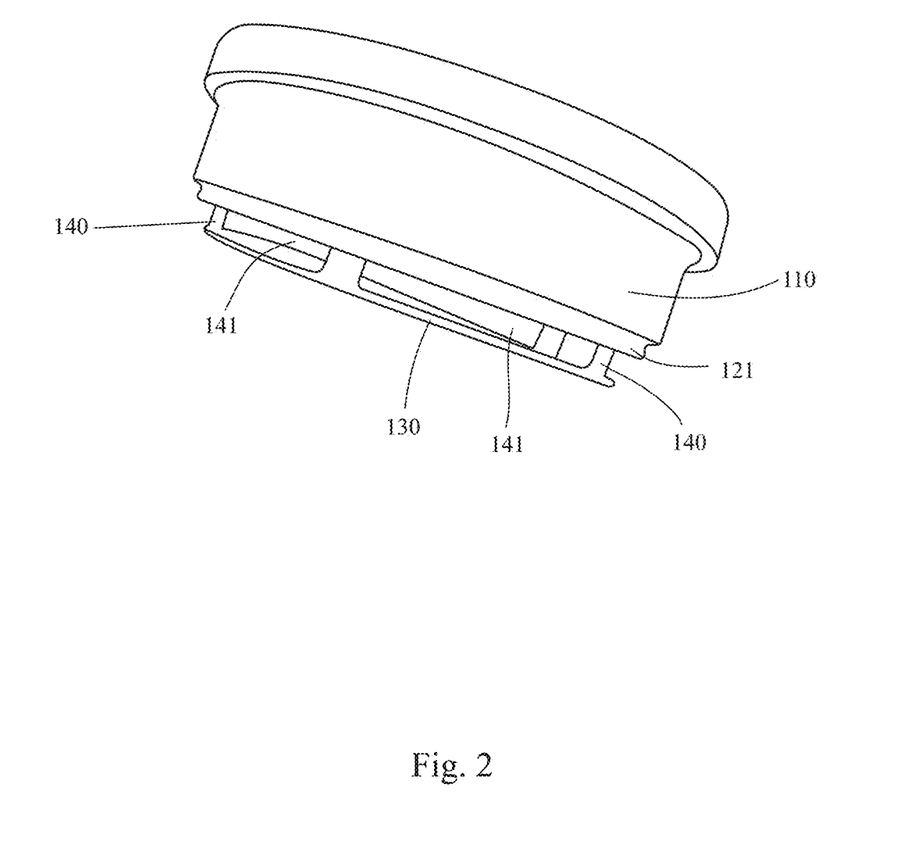
FIG. 2 is a perspective view showing the water filter of FIG. 1 with the third filter material layer removed.

As illustrated, a plurality of spaced ribs 140 are provided to connect an underside of the support member 121 with a top surface of the water impermeable plate 130 so as to define a plurality of windows 141 between the deflector plate 120 and the water impermeable plate 130 (see FIG. 2). The ribs 140 may be connected with the support member 121 and the water impermeable plate 130 using any method known in the art, for example, they may be made of a plastic material and molded together integrally. The circular gap 131 is in fluid communication with the windows 141.

Figure 1:
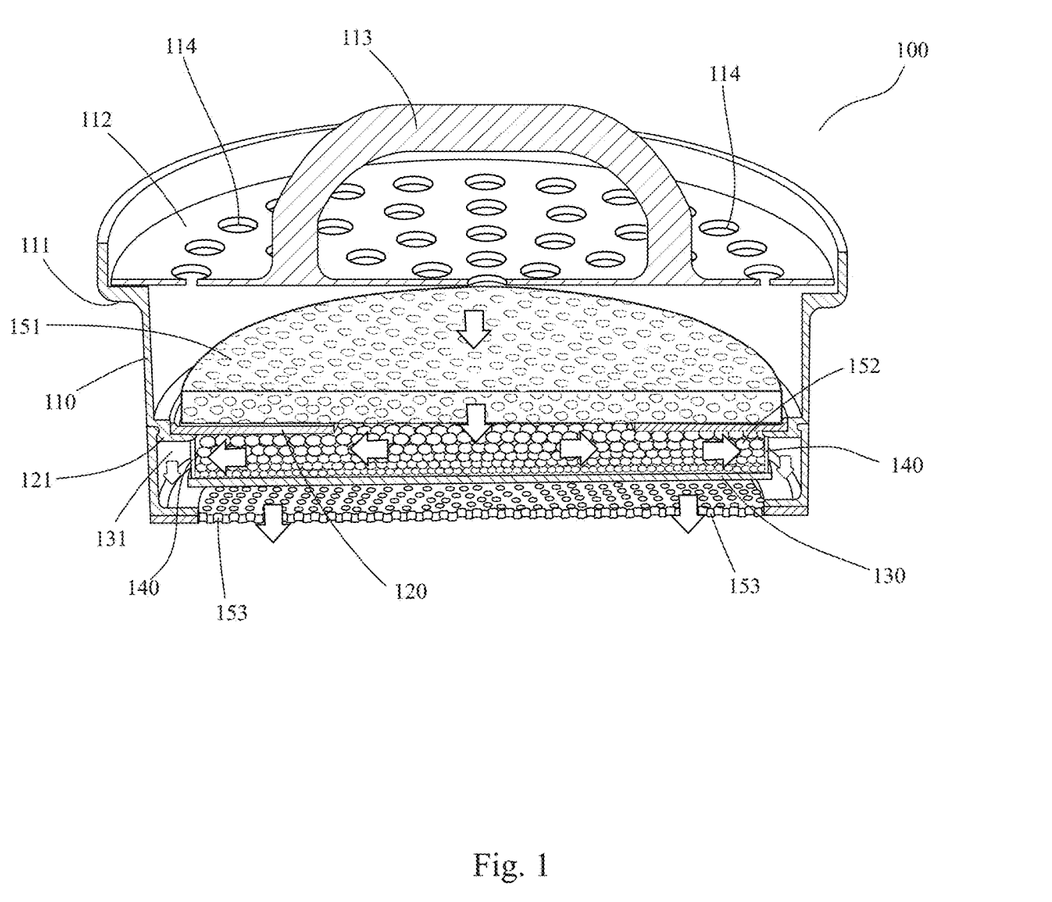
FIG. 1 is a cross-sectional view of a water filter constructed consistent with a first embodiment of the invention.

The water filter 100 further comprises a filter media for filtering the water to remove or reduce the concentration of bacteria, viruses and particulate matters. In particular, the filter media comprises a first filter material layer 151 useful as a coarse filter of the water flowing from the water inlets 114 into the filter. The first filter material layer 151 may consist of a first filter material, for instance, nylon or other suitable filtration material known in the art. The first filter material layer 151 is arranged in a space defined by the top cover 112 and the deflector plate 120 within the housing 110.

The filter media further comprises a second filter material layer 152 comprising the second filter material which is arranged in a space defined together by the deflector plate 120 and the water impermeable plate 130. The second filter material is, for example, activated carbon, or ion exchange resin, or a mixture thereof.

Figure 3:
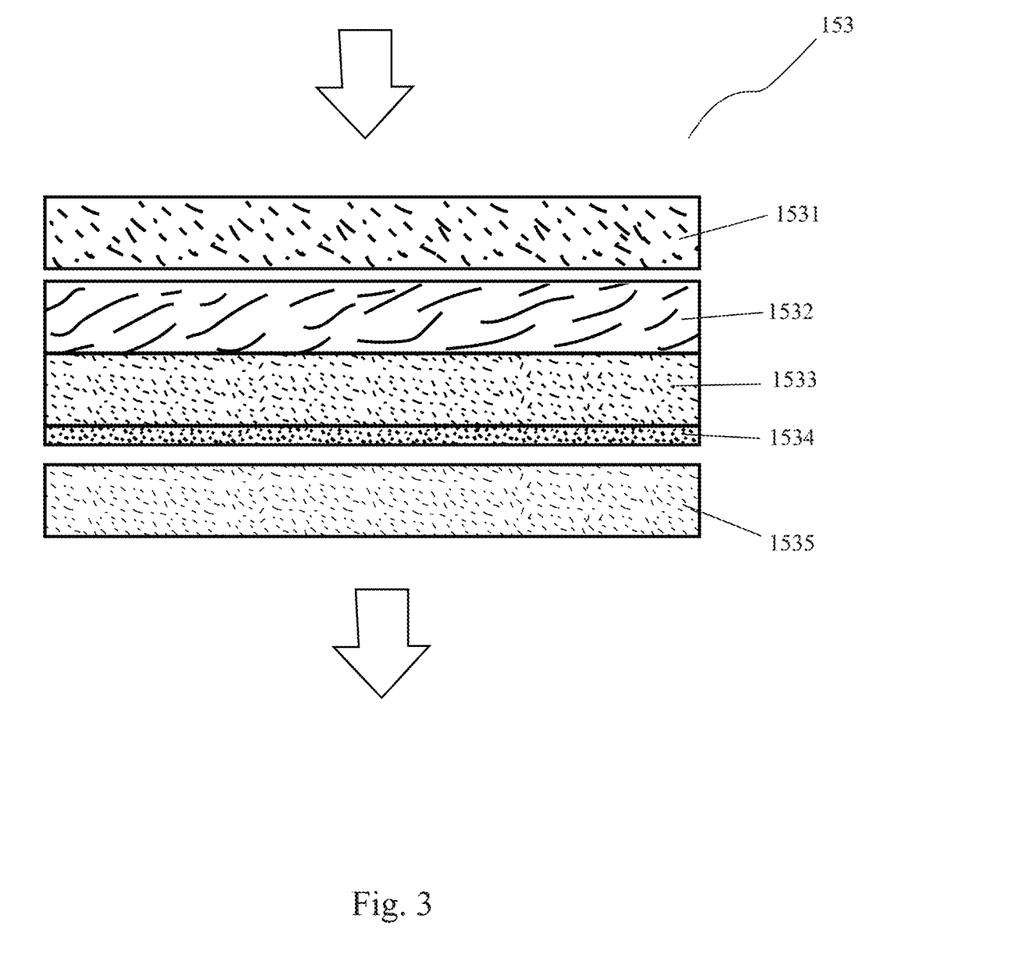
FIG. 3 is a schematic diagram showing a laminate of the third filter material layer useful in the water filter of FIG. 1.
Figure 4:
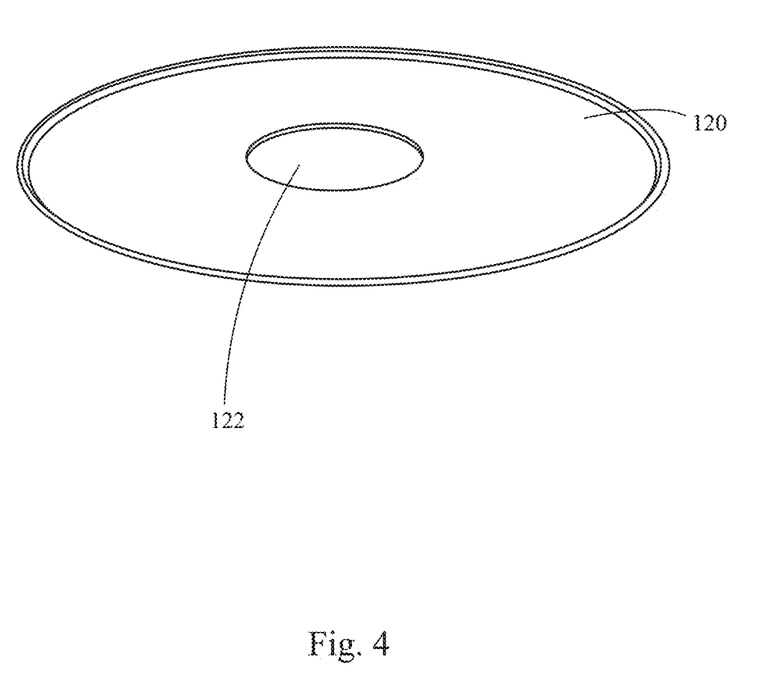
FIG. 4 is a top view of the deflector plate useful in the water filter of FIG. 1.

A feature of the water filter 100 is a third filter material layer 153 disposed to close the open bottom of the housing 110 by a method known in the art. For example, the third filter material layer 153 is held in a circular ring which may be fastened to the bottom of the housing 110. The water coming from the circular gap 131 is guided to flow into the third filter material layer 153 and out of the water filter 100. There is illustrated in FIG. 3 a particularly preferred embodiment of the third filter material layer 153. The third filter material layer 153 is generally a laminated structure. In the illustrated embodiment illustrated in FIG. 3, the laminated structure comprises a supporting layer 1531, a prefilter layer 1532, a nanofiber-coated layer 1533, a nanofiber layer 1534, and a protective layer 1535 seen in the water flow direction. The supporting layer 1531 may be formed with polyethylene terephthalate (PET) having a basic weight in the range of about 10 to 80 gsm, preferably about 40 gsm. The prefilter layer 1532 may consist of absorbent fabric having a basic weight in the range of about 10 to 150 gsm, for example about 40 to 80 gsm, preferably 65 gsm. The nanofiber layer 1533 may be formed with a plurality of polymer-based nanofibers having a diameter in the range of 10 to 900 nanometer, which are capable of removing or reducing bacteria, viruses and heavy metals. The nanofiber-coated layer 1534 and the protective layer 1535 may be formed with PET having a basic weight in the range of about 5 to 70 gsm, preferably about 30 gsm, respectively. The water flows from the second filter material layer 152 through the circular gap 131 into this third filter material layer 153, and then runs through the nanofiber-based laminate filter layer to flow out of the water filter 100.

Advantageously, the three layers 1532, 1533, 1534 held between the two outer layers 1531, 1535 are laminated together using any method known in the art, for example hot-melt laminating methods. The laminated structure is then overlaid with the top supporting layer 1531, and is placed directly over the bottom protective layer 1535.

The water flows into the first filter material layer 151 via the water inlets 114, and the filtered water by the first filter material layer 151 flows down through the central aperture 122 of the deflector plate 120, and then is guided by the water impermeable plate 130 to deflect the flow of the water through transversely within the second filter material layer 152 towards the plurality of windows 141 formed by the ribs 140, the water impermeable plate 130 and the deflector plate 120. The filtered water by the second filter material layer 152 flows through the windows 141 and then into the circular gap 131 between the water impermeable plate 130 and the housing 110. Through the circular gap 131, the water would flow down to the third filter material layer 153 that is placed to close the open bottom of the housing 110. The extended water flow path follows the arrow direction shown in FIG. 1.

Because of using the design of the deflector structure, a flow path for the water to flow in the filter 100 is formed by the first filter material layer 151→the deflector plate 120→the central aperture 122 of the deflector plate 120→the second filter material layer 152→the plurality of windows 141→the circular gap 131→the third filter material layer 153→outside the housing 110 of the filter 100. The deflector structure enables to deflect and guide the water to flow in the tortuous path within the housing, thereby to significantly increase the length of the flow path, which in turn increases the residence time of the water in the filter 100 and the contact surface of water with the filter media for improved filtration effect, at the same time to greatly decrease the thickness of the filter 100. The first and second filter material layers 151, 152 are effective to remove and intercept chlorine, heavy metals and other particulate matters. The nanofiber laminated structure plays the role of effectively filtering out most nano-particles, bacteria, viruses present in the water while maintaining a low pressure drop.

The filter 100 is able to achieve the comprehensive depth filtration, and features the significant reduction in packing depth of the conventional filter materials like porous resin beads, activated carbon articles, due to the design of tortuous flow path. Therefore, the filter 100 can be of a compact configuration but still achieve reliable filtration performance.

Figure 5:
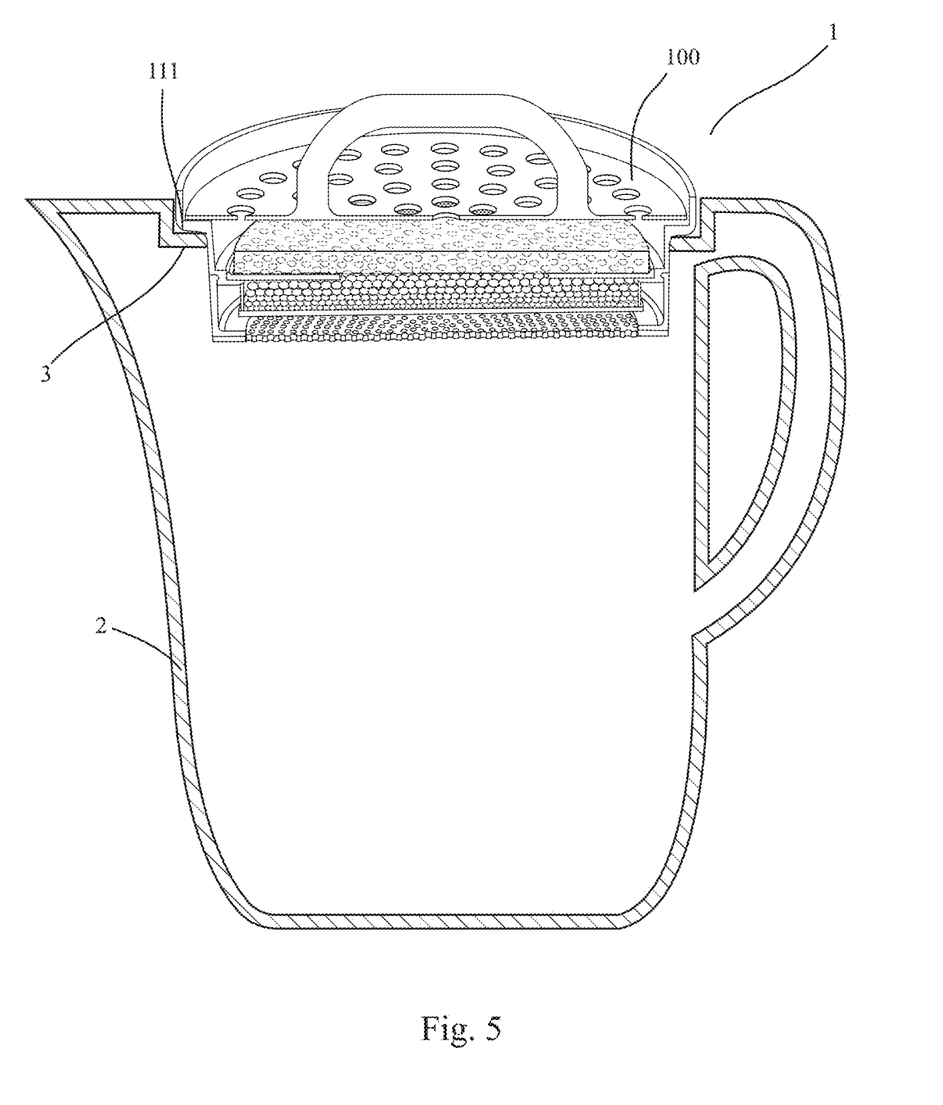
FIG. 5 is a perspective view of an exemplary pour through pitcher comprising the water filter of FIG. 1.

Now turning to FIG. 5, there is illustrated a water pitcher 1 comprising a reservoir 2 for storing filtered water, and a pitcher top. The reservoir 2 has an open-top rim 3. The pitcher top of the pitcher 1 is formed by the filter 100 discussed above and shown in FIGS. 1-3. The upper rim 111 of the housing 110 of the filter 100 is removably engageable with the open-top rim 3 of the reservoir 2, with the top cover 112 as the lid of the water pitcher 1. It would be appreciated that an additional lid member may be provided to cover the top cover 112 to avoid dust. The filtered water can flow from the filter 100 into the reservoir 2.

Figure 8:
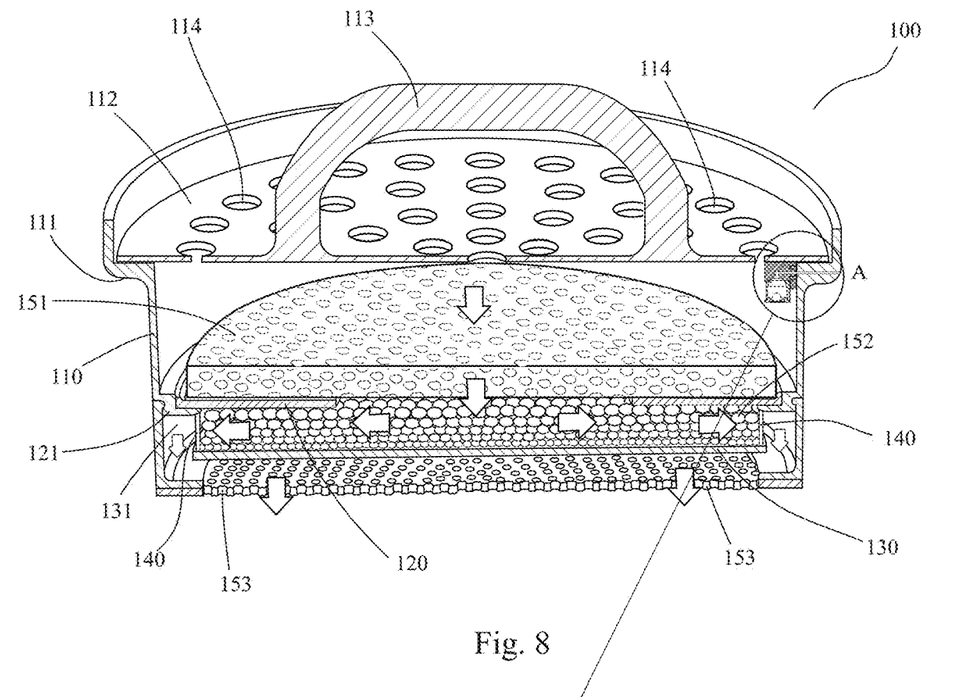
FIG. 8 is a cross-sectional view of the water filter of FIG. 1 with an air release device incorporated.

In some cases, it is likely that air inside the water filter 100 would not be able escape and remains in the interior of the water filter 100, which may have an impact on the water flow rate through the water filter 100. In order to solve this problem, an air release device 160 constructed consistent with a preferred embodiment of the invention is incorporated into the water filter 100 as shown in FIG. 8.

Figure 9:
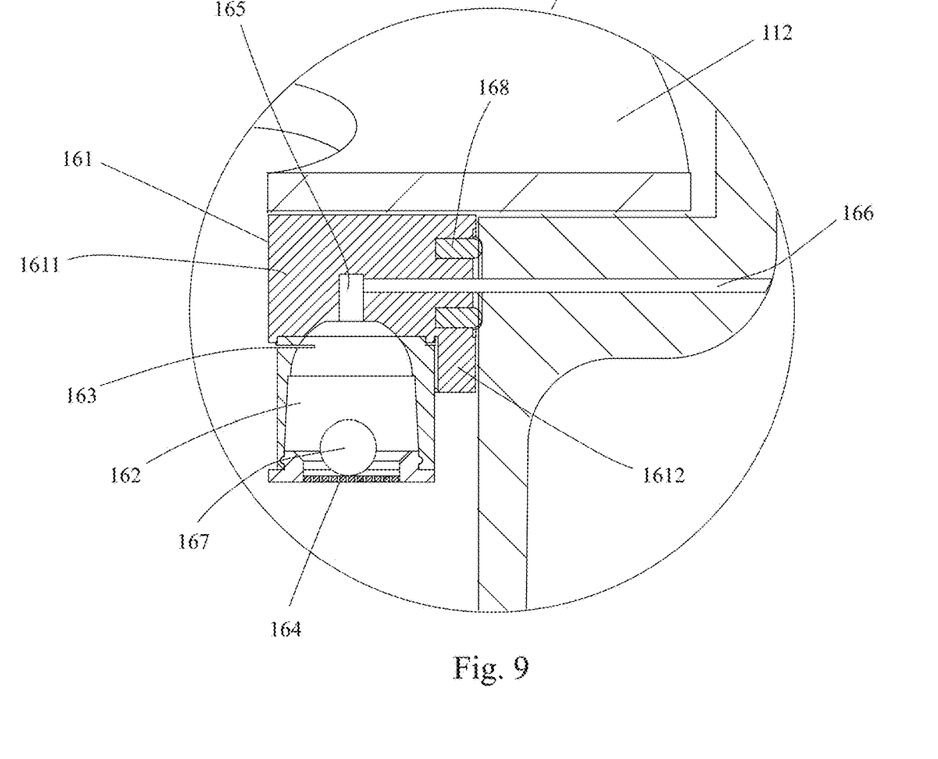
FIG. 9 is an enlarged view of Section A of FIG. 8 showing the air release device.
Figure 10A:
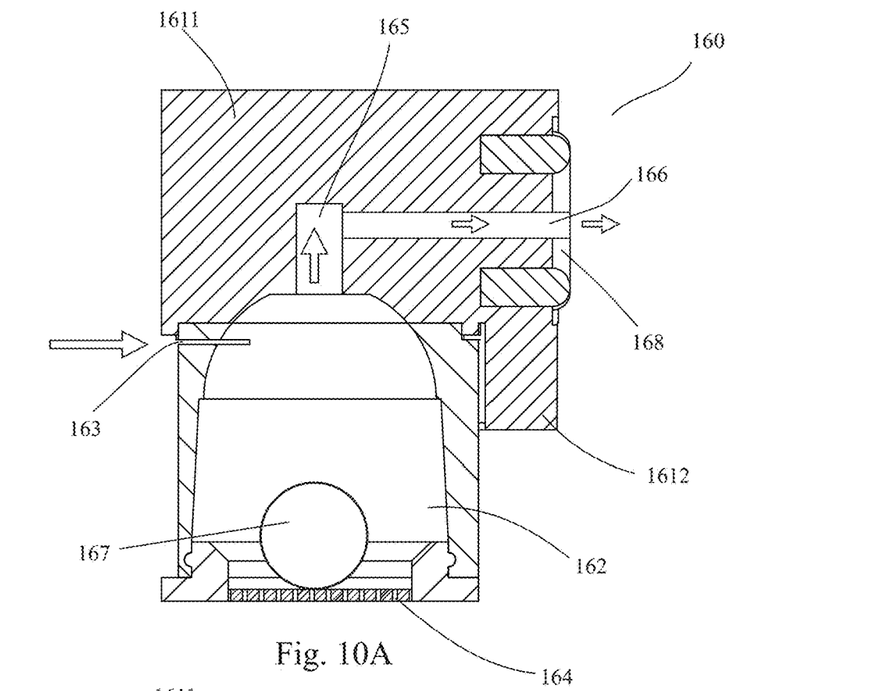
FIG. 10A is a cross sectional view of fluid communication between the inside and the outside of the water filter remains open by the air release device.
Figure 10B:
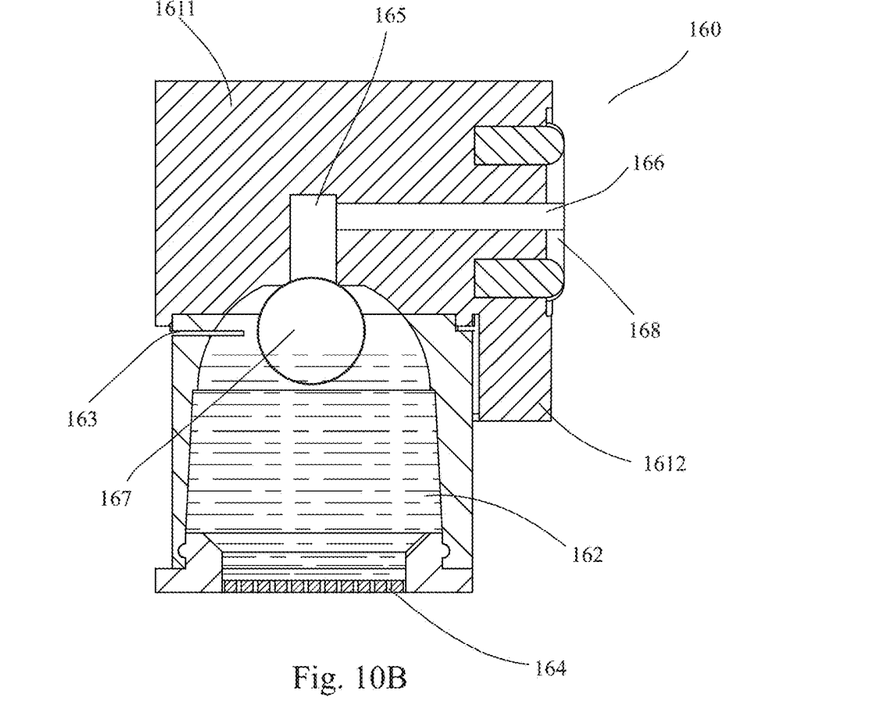
FIG. 10B is a cross sectional view of the fluid communication between the inside and the outside of the water filter is blocked by the air release device.

There is clearly illustrated the air release device 160 in FIGS. 9, 10A and 10B, which comprises a top portion 161 and an inner cavity 162 positioned beneath the top portion 161 and being in fluid communication with both the interior of the water filter 100 and the ambient environment. Specifically, the top portion 161 is a generally L-shaped, and includes a horizontal part 1611 and a vertical part 1612 attached to the side wall of the water filter 100 by, for example, molding together with the water filter 100. The air release device 160 defines the inner cavity 162, at least one air inlet 163 positioned at an upper portion of the inner cavity 162, one or more apertures or channels 164 are formed at a bottom of the inner cavity 162 to allow for inflow of the water from the water filter, and an air outlet 165 positioned on top of the inner cavity 161. The air remaining in the water filter 100 flows into the inner cavity 162 through the air inlet 163. The air outlet 165 leads to the ambient environment through a lateral passageway 166 relative to a longitudinal axis of the inner cavity 162. The passageway 166 extends through the top portion 161 and the side wall of the housing 110, and thus opens to the ambient environment.

A sealing member 168 is provided between the top portion 161 and the side wall of the housing 110 to create a sealing effect for the passageway 166 which extends through the top portion 161 and the side wall of the water filter 100. The provision of the sealing member 168 can effectively prevent any unwanted leakage of air or water from the passageway 166 into a gap between the top portion 161 and the side wall of the water filter 100.

The air release device 160 further comprises a floating ball 167 that is located in the inner cavity 162 and that is sized such that at least a part of the floating ball 167 can completely block the air outlet 165. The floating ball is able to float up and down to close or open the air outlet 165. Preferably, the inner cavity 162 gradually tapers in a direction from bottom to top in order to confine upward movement of the floating ball 167 towards the air outlet 165. The floating 167 is made of a plastic material, for example, that is capable of floating on the water. When the water level in the water filter 100 rises to reach the apertures or channels 164 at the bottom of the inner cavity 162, the water enters the inner cavity 162 through the apertures or channels 164 and acts on the floating ball 167 which is caused to ascend towards the air outlet 165 until a part of the floating ball 167 closes or blocks the air outlet 165 (see FIG. 10B). The air remaining in the water filter 100 flows into the inner cavity 162 and is discharged when the inner cavity 162 is filling with the water. The air outlet 165 always keeps open and thus the fluid communication between the inside and the outside of the water filter 100 remains until the water level rises to a blockage location of the floating ball 167 to block the air outlet 165. When the filter water flows down and out of the water filter 100 and the water level in the inner cavity 162 falls at the same time, the water exits from the inner cavity 162 through the apertures or channels 164, and the floating ball 167 descends and falls onto the bottom of the inner cavity 162, the air outlet 165 opens so that the fluid communication between the inside and the outside of the water filter 100 resumes.

Figure 11:
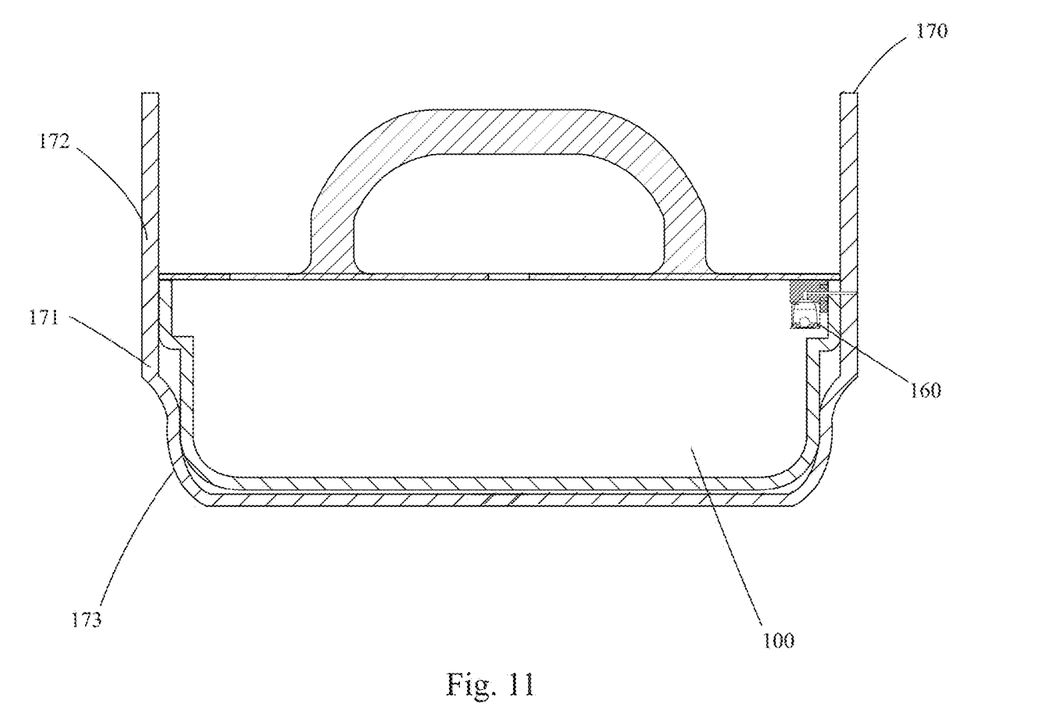
FIG. 11 is a cross sectional view of the water filter placed within a vessel adapted to contain the water ready for receiving filtering treatment.

A vessel 170 may be provided to accommodate the water filter 100 as shown in FIG. 11. The vessel 170 may be configured to have an open or perforated top, and an open or perforated bottom for water inflow and outflow. The vessel 170 comprises a lower portion 171 and an upper portion 172. The lower portion 171 has a downwardly tapering conical side wall 173 adapted to be held on a reservoir for storing the filtered water. The water filter 100 snugly sits within the lower portion 171. For the sake of clarity and simplicity, the internal structure of the filter media of the water filter is not shown in this figure. The upper portion 172 is adapted for containing a volume of water which is subject to purification treatment by the water filter 100.

Figure 6A:
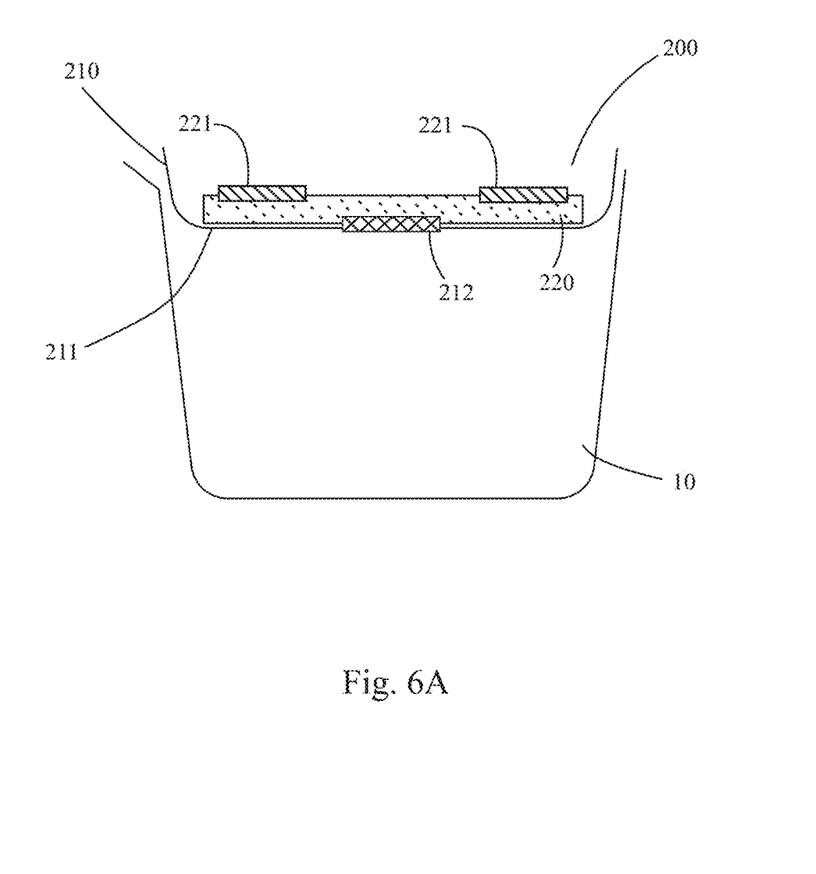
FIG. 6A is a schematic figure showing a water filter constructed consistent with a second embodiment of the invention.
Figure 6B:
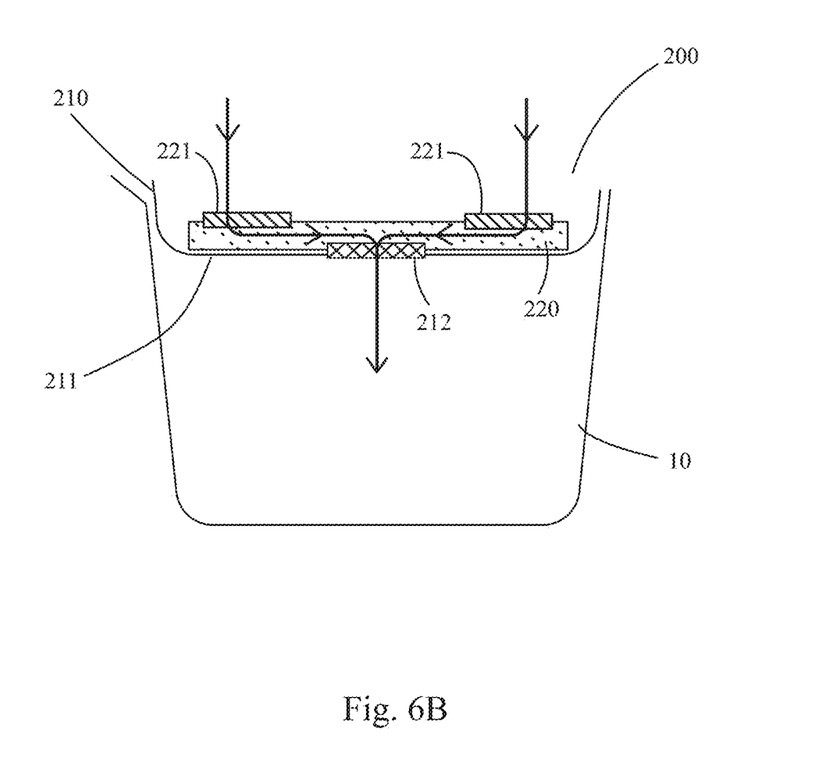
FIG. 6B is a schematic figure showing a flowing path for the fluid in the water filter of FIG. 6A.

FIGS. 6A and 6B provide in schematic manner a water filter 200 of more compact structure constructed consistent with the second embodiment of this invention. The water filter 200 comprises a filter media 220 provided in the disc form, and a housing 210. The filter 200 of this embodiment comprises two or more water inlets 221 arranged in the vicinity of a periphery of the top of the filter 200 to allow the water to enter into an interior of the filter media 220. The water filter 200 also comprises a housing 210 having an open top and a closed bottom 211 for housing the filter media 220. The housing 210 is made of a water impermeable material, and the closed bottom serves as a water impermeable plate to guide the water flow.

The closed bottom 211 of the housing 210 has an aperture centered on the bottom 211, which functions as a water outlet 212 to allow the water to flow out of the filter media 220. Because of the water impermeable housing 210, the water from the filter media 220 cannot flow out of the filter in a vertical direction. Rather, the water is guided to flow towards and leave from the water outlet 212 at the bottom 211 of the housing (FIG. 6B). As such the water inlets 221 are deviated in a staggered manner from the water outlet 212 to create an extended flow path along which the water flows in the filter media 220, and the length of the flow path is maximized in the interior of the filter. Therefore, the water cannot flow directly in a thickness direction (i.e. height direction) of the filter media 220, with a result of increased residence time of the water in the filter.

The filter media 220 may comprise a same filter material, or two or more different filter materials. Preferably, the filter media 220 is configured to have a multi-layered structure. Specifically, the filter media 220 comprises a first filter material to form a first filter material layer, a second filter material to form a second filter material layer, and a third filter material to form a third filter material layer. By way of example, the first filter material is nylon or filterable non-woven fabrics; the second filter material is selected from activated carbon, ion exchange resin beads, and a mixture thereof; and the third filter material is a nanofiber layer, for example the nanofiber-based laminate discussed above in the first embodiment. The non-woven fabric may be in the form of a multi-layer structure comprising polyacrylonitrile (PAN), Polyethylene naphthalate (PEN) or the like.

In some cases, the interior of the filter media 220 may be delimited by impermeable partitions to create a more tortuous flow path. Further, the filter media 220 may comprise a layer of nanofiber laminate, for example the one discussed in the first embodiment herein, to further increase the filtration efficiency.

Like the water filter 100 of the above first embodiment, the water filter 200 may be constructed to form a pitcher top adapted to be removably or pivotably engageable with an open-top rim of the water pitcher 10. The water is flowing into the filter media 220 via the water inlets 221, transversely passes through the interior of the filter media 220 towards the water outlet 212 due to the water impermeable housing 210, and then leaves out of the filter 200 into a reservoir of the pitcher 10. This flow path provides the extended residence time for the water to increase the filtration efficiency.

Figure 7A:
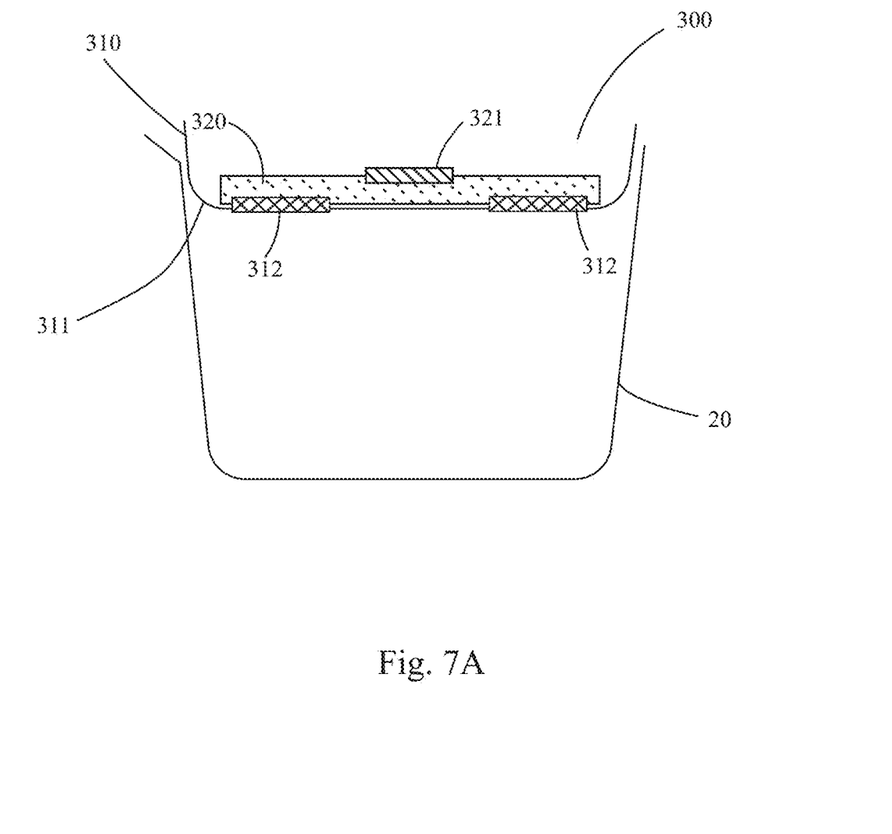
FIG. 7A is a schematic figure showing a water filter constructed consistent with a third embodiment of the invention.
Figure 7B:
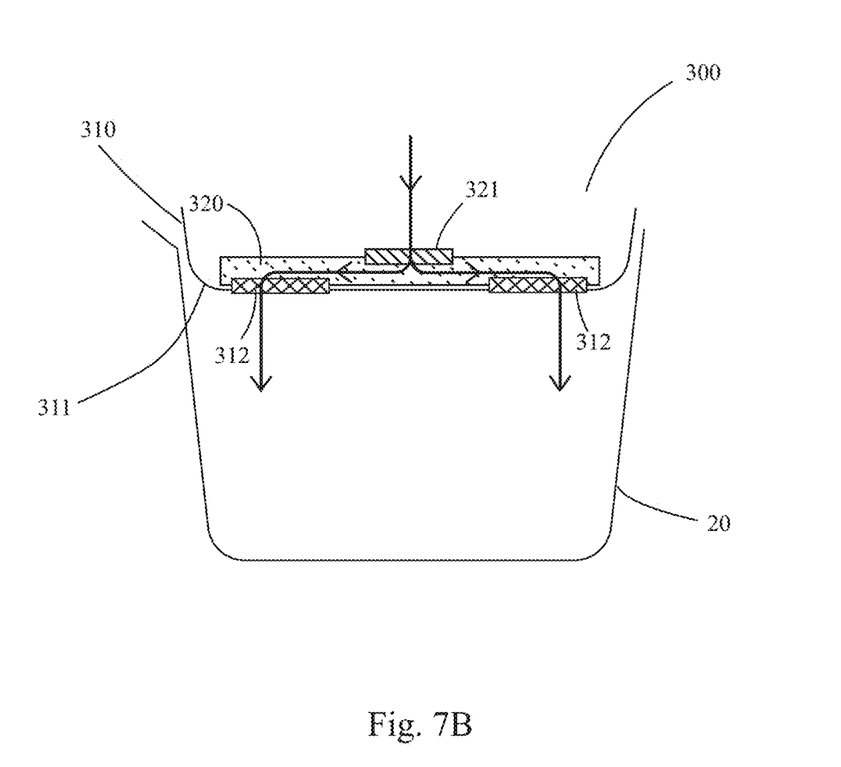
FIG. 7B is a schematic figure showing a flowing path for the fluid in the water filter of FIG. 7A.

FIGS. 7A and 7B provide in schematic manner a water filter 300 constructed consistent with the third embodiment of this invention. The water filter 300 of this embodiment is substantially same in structure as the water filter 200 of the above second embodiment, but differs in the arrangement of water inlets and water outlets. As illustrated, the water filter 300 comprises a filter media 320 and a water impermeable housing 310 for housing the filter media 320. Only one water inlet 321 is centered in the filter media 320 to allow for flow of the water into an interior of the filter media 220. The housing 310 has a closed bottom 311 provided with two or more water outlets 312 arranged in the vicinity of a side wall of the housing 311, and the water is guided to flow towards and leave from the water outlets 312 adjacent to the side wall of the housing (FIG. 7B). Therefore, an extended flow path is created for the water, with a result of increased residence time of the water in the filter.

Again, the water filter 300 may be constructed to form a pitcher top adapted to be removably or pivotably engageable with an open-top rim of the water pitcher 20.

The filters of the invention can be in the disc form, depending on the size and application of the water container. The filters 200, 300 preferably have a ratio of width to depth in the range of 1:1, 2:1, 3:1, 4:1, 5:1, 6:1, 8:1, 10:1, 12:1, 15:1, 18:1, 20:1, 25:1 to 30:1.

Therefore, the present invention provides a fluid filter which is constructed compactly such that the filter does not submerge into the filtered water, and does not occupy significantly the internal space of the water container. Due to the compact structure, the fluid filter of the invention enables to increase flow rate of the fluid and maximize the space usage for the filtered fluid. In addition, the extended flow path leads to an extended period of residence time within interior of the filter media, which helps to increase the chance of interaction between the filter materials and the fluid during filtration process. Accordingly, filtration efficiency can be enhanced.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

NUMERICAL REFERENCES 1, 10, 20 pitcher
2 reservoir
3 open-top rim
100, 200, 300 filter
110, 210, 310 housing
111 upper rim
112 top cover
113 handle
114, 221, 321 water inlet
120 deflector plate
121 support member
130 water impermeable plate
122 central aperture
131 circular gap
140 rib
141 window
151 first filter material layer
152 second filter material layer
153 third filter material layer
1531 supporting layer
1532 prefilter layer
1533 nanofiber-coated layer
1534 nanofiber layer
1535 protective layer
160 air release device
161 top portion
1611 horizontal part
1612 vertical part
162 inner cavity
163 air inlet
164 aperture or channel
165 air outlet
166 passageway
167 floating ball
168 sealing member
170 vessel
171 lower portion
172 upper portion
173 downwardly tapering conical side wall
211, 311 closed bottom
212, 312 water outlet
220, 320 filter media

What is claimed is:

1. A fluid filter for treating fluid in a fluid container, comprising:
   a filter media for filtering the fluid, and
   a filter housing having a fluid impermeable plate to carry the filter media, wherein one or more fluid outlets are formed through the fluid impermeable plate to allow the fluid to flow out of the filter media, said one or more fluid outlets are arranged at a position deviated from one or more fluid inlets in a height direction of the filter media, through the fluid inlets the fluid enters into an interior of the filter media, so that a flow path along which the fluid flows in the filter media is extended to provide an extended fluid residence time, wherein the filter housing further comprises a deflector plate, and a support member laterally extends from a side wall of the filter housing to support the deflector plate, and wherein a plurality of spaced ribs are provided to connect the support member and the fluid impermeable plate, thereby to define a plurality of windows between the deflector plate and the fluid impermeable plate, through the windows the fluid flows into a gap between the side wall of the filter housing and the fluid impermeable plate.

2. The fluid filter according to claim 1, wherein the filter housing is configured to comprise:
an open bottom,
an upper rim,
a top cover placed over the upper rim and having a plurality of fluid inlets formed therethrough, and
the fluid impermeable plate disposed within the filter housing to define the gap between the side wall of the filter housing and the fluid impermeable plate, wherein the fluid flows into the plurality of fluid inlets and through the gap.

3. The fluid filter according to claim 1, wherein the fluid inlets are arranged adjacent to a periphery of the filter media, and one fluid outlet is centered in the fluid impermeable plate.

4. The fluid filter according to claim 3, wherein one fluid inlet is centered on the filter media, and the fluid outlets are arranged adjacent to a periphery of the fluid impermeable plate.

5. The fluid filter according to claim 1, wherein the filter media comprises one or more layers of filter materials of same type or different types.

6. The fluid filter according to claim 1, wherein the fluid filter is configured in a disc form.

7. A fluid filter for treating fluid in a fluid container, comprising:
a filter media for filtering the fluid, and
a filter housing having a fluid impermeable plate to carry the filter media, wherein one or more fluid outlets are formed through the fluid impermeable plate to allow the fluid to flow out of the filter media, said one or more fluid outlets are arranged at a position deviated from one or more fluid inlets in a height direction of the filter media, through the fluid inlets the fluid enters into an interior of the filter media, so that a flow path along which the fluid flows in the filter media is extended to provide an extended fluid residence time,
wherein the filter housing is configured to comprise:
an open bottom,
an upper rim,
a top cover placed over the upper rim and having a plurality of fluid inlets formed therethrough, and
the fluid impermeable plate disposed within the filter housing to define a gap between a side wall of the filter housing and the fluid impermeable plate, wherein the fluid flows into the plurality of fluid inlets and through the gap,
wherein the filter housing further comprises a deflector plate provided between the top cover and the fluid impermeable plate and having a central aperture,
wherein the filter media comprises a first filter material layer disposed between the top cover and the deflector plate, and a second filter material layer disposed between the deflector plate and the fluid impermeable plate, and
wherein the fluid flowing from the fluid inlets of the top cover is guided to flow into the first filter material layer and down through the central aperture of the deflector plate into a center of the second filter material layer, such that the fluid is deflected towards the side wall of the filter housing to reach the gap defined by the fluid impermeable plate and the side wall of the filter housing.

8. The fluid filter according to claim 7, wherein the filter media further comprises a third filter material layer disposed to close the open bottom of the filter housing, wherein the liquid flowing through the gap is guided to flow into the third filter material layer and out of the fluid filter.

9. The fluid filter according to claim 8, wherein the third filter material is a laminate comprising a supporting layer, a prefilter layer, a nanofiber-coated layer, and a nanofiber layer seen in a direction of fluid flow direction.

10. The fluid filter according to claim 9, wherein the supporting layer comprises polyethylene terephthalate (PET); the prefilter layer comprises an absorbent fabric; the nanofiber layer comprises a plurality of polymer-based nanofibers; and the nanofiber-coated layer comprises PET coated with a plurality of polymer-based nanofibers.

11. The fluid filter according to claim 10, wherein the laminate further comprises a protective layer as an outermost layer, and the protective layer comprises PET having a basic weight in a range of about 5 to 70 grams per square meter (gsm).

12. The fluid filter according to claim 7, wherein the first filter material layer comprises nylon and/or a filterable non-woven fabric; and the second filter material layer comprises activated carbon, or ion exchange resin or a combination thereof.

13. The fluid filter according to claim 10, wherein the supporting layer comprises polyethylene terephthalate (PET) having a basic weight in a range of about 10 to 80 grams per square meter (gsm); the prefilter layer comprises an absorbent fabric having a basic weight in a range of about 10 to 150 grams per square meter (gsm); and the nanofiber-coated layer comprises PET coated with a plurality of polymer-based nanofibers with the PET having a basic weight in a range of about 5 to 70 grams per square meter (gsm).

14. A fluid filter for treating fluid in a fluid container, comprising:
a filter media for filtering the fluid, and
a filter housing having a fluid impermeable plate to carry the filter media, wherein one or more fluid outlets are formed through the fluid impermeable plate to allow the fluid to flow out of the filter media, said one or more fluid outlets are arranged at a position deviated from one or more fluid inlets in a height direction of the filter media, through the fluid inlets the fluid enters into an interior of the filter media, so that a flow path along which the fluid flows in the filter media is extended to provide an extended fluid residence time,
wherein the filter media comprises one or more layers of filter materials of same type or different types,
wherein the filter media is configured to have a multi-layered structure comprising a first filter material layer, a second filter material layer and a third filter material layer in a direction of fluid flow, wherein the first filter material layer comprises nylon or a filterable nonwoven fabric, the second filter material layer comprises activated carbon, or ion exchange resin or a combination thereof, and the third filter material layer comprises a nanofiber layer.

15. The fluid filter according to claim 14, wherein the filterable non-woven fabric is provided in the form of a multi-layer structure comprising polyacrylonitrile (PAN) and/or polyethylene naphthalate (PEN).

16. A water container having a water purifying device, wherein the water purifying device comprises the fluid filter according to claim 1.

17. The water container according to claim 16, wherein the filter housing of the fluid filter is provided with an upper rim adapted to engage with an open-top rim of the water container.

18. The water container according to claim 16, which is a water filter pitcher including a reservoir for storing filtered water, wherein the fluid filter is configured as a pitcher top removably engageable with an open-top rim of the reservoir.

19. An air release device for discharge of air remaining in an interior of a fluid filter to an atmosphere, wherein the air release device is incorporated into the filter housing of the fluid filter according to claim 1 at a position adjacent to an upper rim of the filter housing.

20. The air release device according to claim 19, wherein the air release device defines an inner cavity through which interior of the fluid filter communicates with the atmosphere in fluidic manner, and the air release device comprises a floating ball that is located in the inner cavity and capable of floating on the fluid, wherein the floating ball is caused to ascend until at least a part of the floating ball blocks the fluid communication between the interior of the fluid filter and the atmosphere when fluid level in the inner cavity rises; and the floating ball descends and resumes the fluid communication between the interior of the fluid filter and the atmosphere when the fluid level falls.

21. The air release device according to claim 20, further comprising:
 a fixing portion attached to the filter housing,
 at least one air inlet through which the air remaining in the interior of the fluid filter flows into the inner cavity,
 one or more apertures or channels formed at a lower part of the inner cavity to allow for inflow of the fluid from the fluid filter,
 an air outlet positioned at an upper part of the inner cavity, and
 a passageway in communication with the air outlet and leading to the atmosphere,
 wherein the floating ball ascends until at least a part of the floating ball blocks the air outlet when the fluid level in the inner cavity rises; and the floating ball descends and moves away from the air outlet when the fluid level in the inner cavity falls.

22. The air release device according to claim 21, further comprising a sealing member arranged between the fixing portion and the filter housing to create a sealing effect for the passageway.

\* \* \* \* \*